United States Patent [19]

Milianowicz

[11] Patent Number: 4,698,470
[45] Date of Patent: * Oct. 6, 1987

[54] MULTIPLE-IMPACT SHOCK-ABSORBING ASSEMBLY FOR CIRCUIT INTERRUPTER AND OTHER APPARATUS

[75] Inventor: Stanislaw A. Milianowicz, Monroeville, Pa.

[73] Assignee: Westinghouse Electric Corp., Pittsburgh, Pa.

[ * ] Notice: The portion of the term of this patent subsequent to Sep. 16, 2003 has been disclaimed.

[21] Appl. No.: 866,183

[22] Filed: May 22, 1986

[51] Int. Cl.$^4$ .............................................. H01H 3/60
[52] U.S. Cl. ............................ 200/288; 200/153 SC; 335/46; 335/193; 267/140.1; 188/267
[58] Field of Search ...................... 188/267; 267/140.1; 200/288, 153 SC, 153 H, 153 CT; 335/257, 193, 46, 104, 271

[56] References Cited

U.S. PATENT DOCUMENTS

| 2,495,127 | 1/1950 | Oppel | 188/267 X |
| 3,544,415 | 12/1970 | Price et al. | 267/141.1 |
| 3,674,251 | 7/1972 | Tirabassi | 267/162 |
| 3,770,290 | 11/1973 | Bottalico | 188/267 X |
| 4,064,383 | 12/1977 | Barkan | 200/144 B |
| 4,267,419 | 5/1981 | Mayer et al. | 200/288 |
| 4,432,491 | 2/1984 | Kurokawa | 188/267 |
| 4,491,709 | 1/1985 | Chabot et al. | 200/153 SC |
| 4,612,429 | 9/1986 | Milianowicz | 200/288 |

FOREIGN PATENT DOCUMENTS

| 3306180 | 8/1984 | Fed. Rep. of Germany | 188/267 |
| 0069136 | 4/1982 | Japan | 188/267 |
| 0769142 | 10/1980 | U.S.S.R. | 188/267 |

Primary Examiner—Henry J. Recla
Assistant Examiner—Ernest G. Cusick
Attorney, Agent, or Firm—L. P. Johns

[57] ABSTRACT

The kinetic energy generated by the rapidly moving contact and coupled operating mechanism of a tripped circuit breaker or similar apparatus is dissipated by a compressible shock-absorbing assembly comprising a loose stack of freely-movable magnetized metal plates which is mounted in laterally-extending position on a stationary upstanding part of the breaker and is struck by a lever fastened to the main operating shaft of the breaker operating mechanism. The metal plates are freely movable toward and away from one another and are so magnetized that adjacent plates repel one another. The plates are accordingly normally spaced from each other and produce a series of sequentially-occurring impacts and collisions between the plates and the advancing striker lever when the breaker is tripped. The resulting series of momentum exchanges between adjacent plates and the lever quickly dissipates the kinetic energy developed by the trip sequence and brings the breaker operating mechanism and movable contact of the breaker to a smooth stop. The compressible multiple-impact assembly provides a compact shock absorbing means that is especially adapted for use in medium voltage circuit breakers (5 to 35 KV rating) of various types which is not only durable and efficient but very inexpensive and reliable. The improved shock absorber is also adapted for use in guns and the like which require a suitable means for counteracting the recoil produced when the gun is fired. In an alternative embodiment the metal plates are magnetized by induction using a permanent magnet or an electromagnet that is mounted within the circuit breaker and has pole pieces located on opposite sides of the stack of metal plates.

4 Claims, 9 Drawing Figures

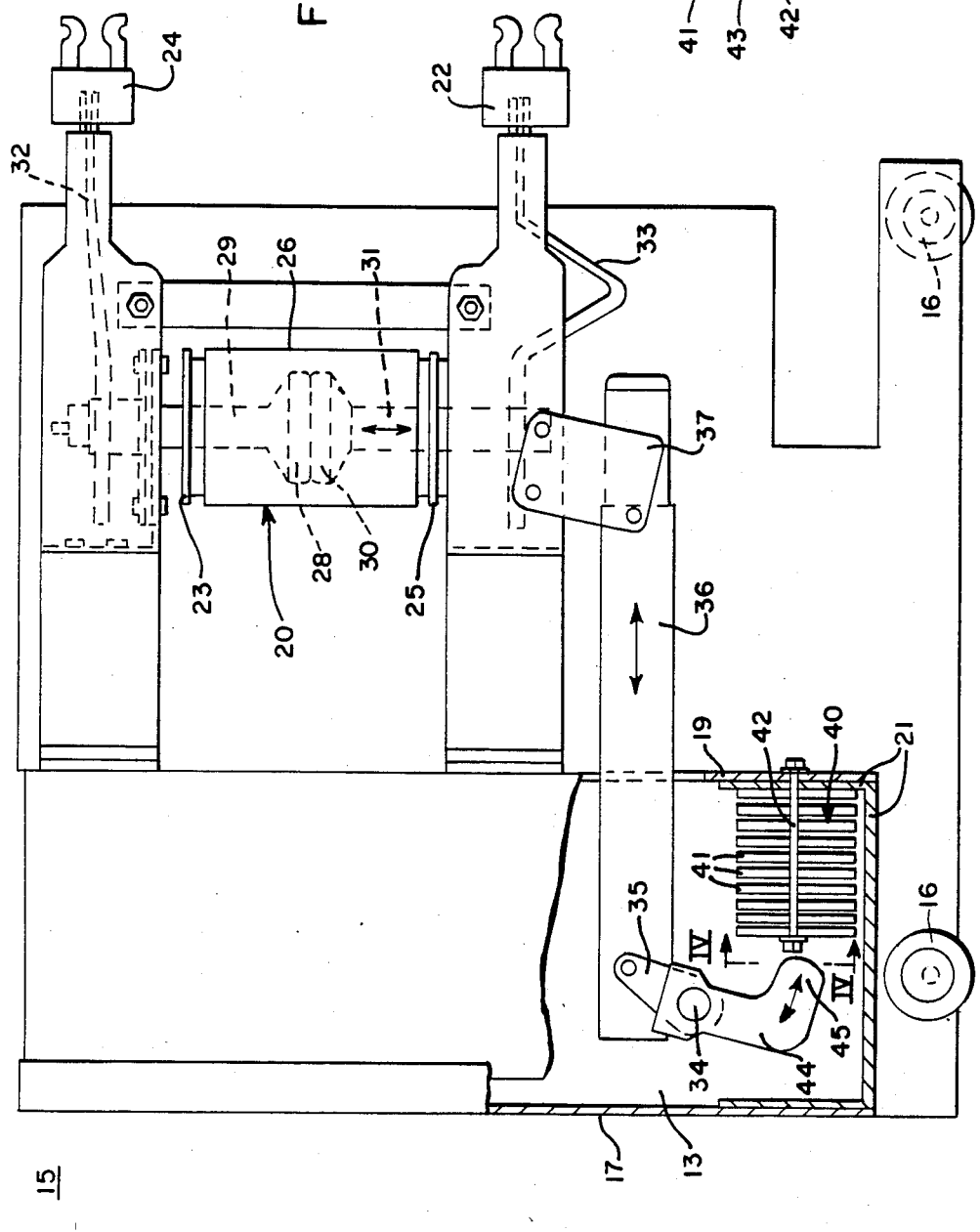
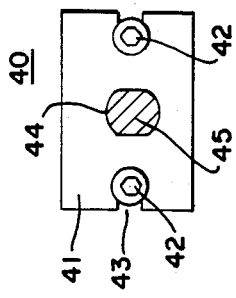

MULTIPLE-IMPACT SHOCK-ABSORBING ASSEMBLY FOR CIRCUIT INTERRUPTER AND OTHER APPARATUS

CROSS-REFERENCE TO RELATED APPLICATION

This application discloses and claims a multiple-impact shock-absorbing assembly that constitutes an improvement over related subject matter disclosed and claimed in copending application Ser. No. 640,425 of the present inventor filed Aug. 13, 1984 entitled "Multiple-Impact Shock Absorbing Means for Circuit Interrupter and Other Apparatus" (now U.S. Pat. No. 4,612,429 issued Sept. 16, 1986), which application is assigned to the assignee of this application.

BACKGROUND OF THE INVENTION

1. Field of the Invention

This invention generally relates to the shock-absorbing art and, more particularly, to a mechanical-impact type shock-absorbing assembly for a circuit interrupter which rapidly dissipates the kinetic energy of the movable contact and its operating mechanism during the opening stroke of the interrupter.

2. Description of the Prior Art

As is well known, power circuit interrupters or breakers generally comprise a pair of separable contacts that are operated within an enclosure which provides an insulating means (a vacuum, $SF_6$ gas, oil, etc.) that efficiently extinguishes the arc generated when the contacts are forceably separated and then prevents the arc from restriking as the contacts continue to be rapidly opened until they are spaced a predetermined distance apart. The contact-opening operation, once triggered by a suitable signal means (manual or automatic) and trip mechanism, is completed in as short an interval of time as is mechanically possible in order to provide maximum protection to the power transmission line and associated equipment.

A major problem in the design of such power circuit breakers is the provision of suitable means for not only dissipating the kinetic energy of the movable contact and associated moving parts of the breaker during the contact-opening stroke but controlling the motion and rest positions of these components. The amount of override beyond the ideal rest position of the movable contact and the distance that the contact rebounds from such rest position, when the breaker is tripped, is determined by the mechanical, electrical and thermodynamic characteristics of the breaker and must not exceed certain limits if the breaker is to operate properly. Moreover, due to the large size and mass of the contacts and the related moving parts of the circuit interrupter, the severe mechanical strains imposed on the operating mechanism and associated stationary parts of the interrupter by the rapid deceleration of the moving contact and operating mechanism must be kept within safe limits to avoid excessive mechanical stressing of the operating components and support structure of the interrupter.

It is known in the prior art to use various kinds of shock absorbers to dissipate the kinetic energy of the moving parts of a circuit interrupter in a controlled fashion during the contact-opening operation. Such prior art shock absorbers were of the hydraulic, pneumatic, strain energy or friction type and, while generally satisfactory from a functional standpoint, they were rather complicated in construction and required periodic maintenance and inspection to insure that they were in good operating condition and properly adjusted. Moreover, they were not as cost-effective as the device described hereinafter.

An energy-absorbing stop assembly for an air-borne magnetic field detector which employs springs and a viscous damping liquid is disclosed in U.S. Pat. No. 3,674,251 (Tirabassi). Various other types of stop and shock-absorbing devices having resilient components are disclosed in U.S. Pat. Nos. 4,064,383 (Barkan); 4,267,419 (Maier et al.); and 4,491,709 (Chabot et al.).

SUMMARY OF THE INVENTION

The present invention avoids the cost and other disadvantages of the shock-absorbing devices used in the prior art circuit interrupters and other apparatus by providing an energy-dissipating means which is simple, reliable, durable, compact and very inexpensive. In accordance with a preferred embodiment of the invention, the kinetic energy of the moving contact and coupled parts of the breaker operating mechanism is absorbed and quickly dissipated by means of a series of momentum exchanges that occur within a stack of metal plates of magnetic material that are separated from each other by a magnetic field and are free to move relative to one another in a direction transverse to the planes of the plates—that is, along a path that extends in substantially the same direction as the axis along which the plates are stacked and struck.

In contrast to the multiple-impact shockabsorbing assembly disclosed and claimed in the aforementioned copending application Ser. No. 640,425 now U.S. Pat. No. 4,612,429, which employs interposed springs or other resilient components to separate the plates one from another, the required spacing between adjacent metal plates in the stack is achieved in accordance with the present invention by employing a magnetic field which acts in such a manner that adjacent plates magnetically repel one another when the plates are assembled in loosely-stacked array. The magnetic field is produced by permanently magnetizing the individual plates (prior to stacking) or by by electromagnet or permanent magnet that is mounted in the circuit breaker housing and has a pair of pole pieces that are located on opposite sides of the stack of metal plates and magnetize the individual plates by induction. Plate separation is facilitated by positioning the stack of magnetized plates in a substantially horizontal position within the circuit breaker and holding them in loosely stacked array with lubricated non-magnetic guide members.

A lever attached to the main operating shaft of the circuit breaker is suitably positioned and movable along a path such that the end of the lever strikes the stack of magnetically-separated metal plates at a predetermined time during the contact-opening stroke of the operating mechanism after the circuit breaker has been tripped. The resultant sudden compression of the stacked assembly of plates produces a series of sequential shock-absorbing interactions and momentum-exchanging impacts between the advancing lever and plates (and between the plates themselves) that rapidly dissipates the kinetic energy and brings the lever and breaker operating mechanism (and thus the movable contact) to a smooth stop.

The unique "energy-quenching" effect produced by the multiple collisions of the magnetically-separated plates in the stack is such that the breaker contact override and rebound are well within the the specification limits. Since the magnetized metal plates can be readily manufactured and assembled and provides the required series of sequential impacts and momentum exchanges without any interposed springs or other resilient components, the improved multiple-impact shock absorber provided by the present invention is not only very economical but is compact, reliable, durable and requires no maintenance or adjustments once it has been installed in the circuit breaker.

BRIEF DESCRIPTION OF THE DRAWINGS

A better understanding of the invention will be obtained by referring to the exemplary embodiments shown in the accompanying drawing, wherein:

FIG. 3 is an enlarged side elevational view, partly in section, of one of the vacuum circuit interrupter units of the switchgear assembly illustrating the manner in which the movable contact and operating mechanism of the interrupter are operatively coupled to the multiple-impact shock-absorbing assembly of the present invention;

FIG. 4 is an elevational view of the striker lever and shock-absorbing assembly taken along line IV—IV of FIG. 3;

BRIEF DESCRIPTION OF THE PREFERRED EMBODIMENTS

While the invention can be employed in various types of switchgear and other apparatus (such as guns, for example) that require a compact reliable shock-absorbing means to arrest the movement of an electrical contact and/or parts of an operating (or recoil) mechanism which are driven aparat at high speed when the apparatus is tripped or activated, it is especially adapted for use in power circuit breakers of various types, such as gas-blast, oil, or magnetic air-brake breakers. However, the invention as here described and illustrated is incorporated in a vacuum type circuit breaker of medium voltage rating.

Figure 1:
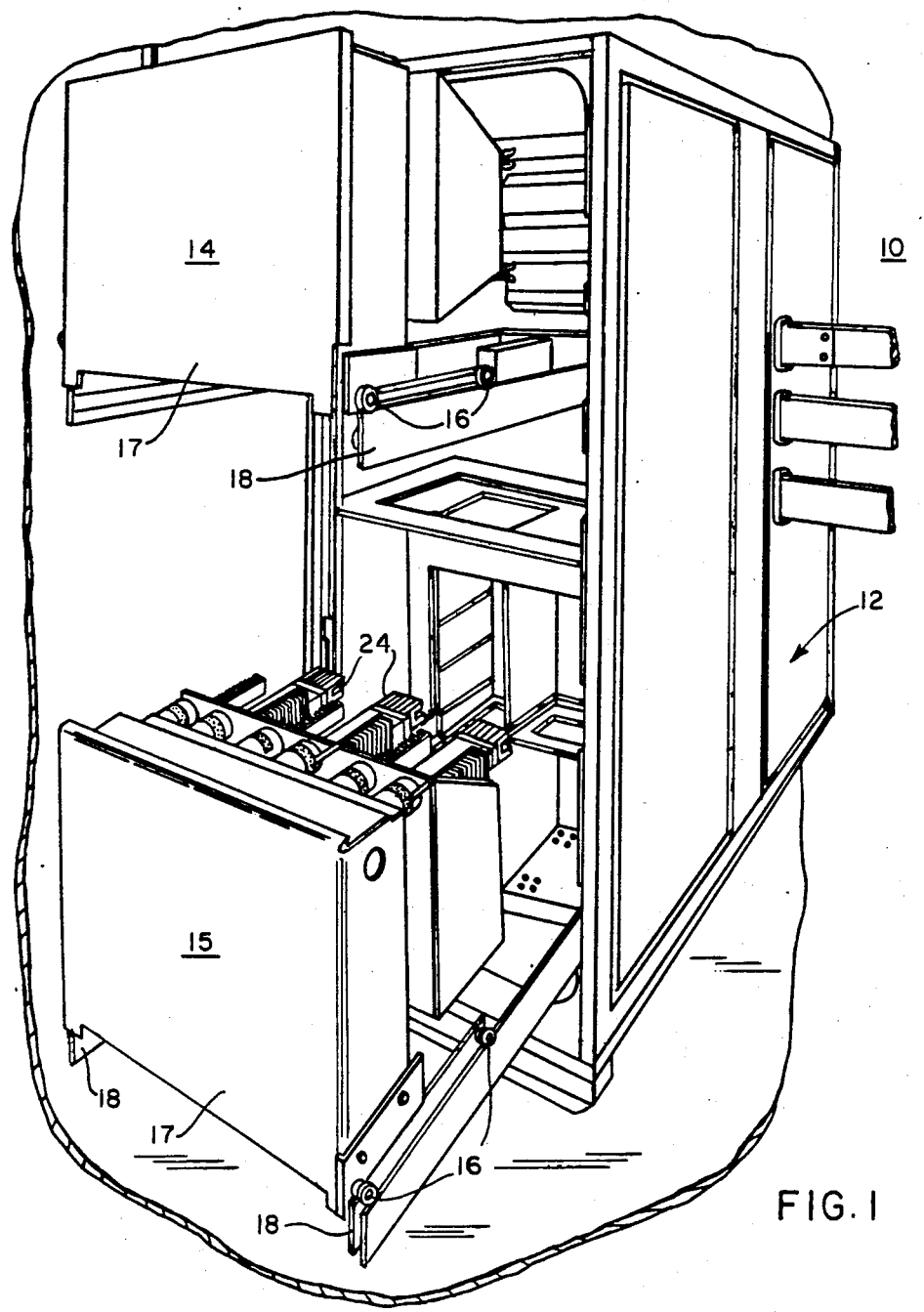
FIG. 1 is a front perspective view of a metal-clad multi-section switchgear assembly which contains vacuum type circuit interrupters that are fitted with the improved shock-absorbing structure of the present invention, the circuit interrupter units being shown in their withdrawn exposed positions relative to the metal enclosure.
Figure 2:
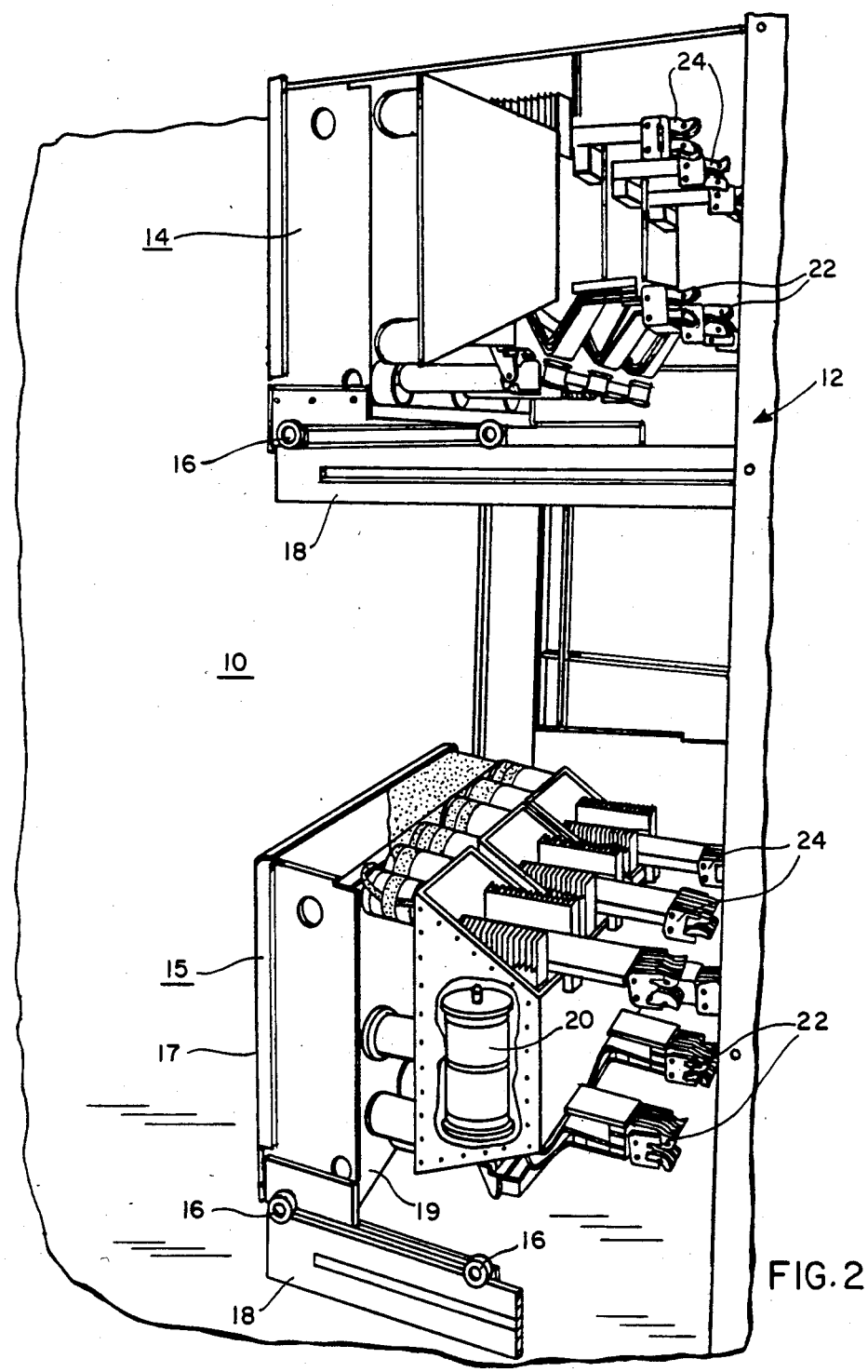
FIG. 2 is a side perspective view of the withdrawn circuit interrupter units of the switchgear apparatus shown in FIG. 1.

Referring now to the drawings in detail, in FIGS. 1 and 2 there is shown a metal-clad switchgear assembly 10 which includes a metal cabinet or enclosure 12 having a pair of vertically arranged three-phase circuit interrupter units 14 and 15 that are adapted to be drawn out of the enclosure for servicing or inspection in the manner illustrated. The circuit interrupter units 14 and 15 are movably mounted on wheels 16 and retractable rails 18 so that the units can be pulled out of the metal enclosure 12 and then returned into operating position as required. The circuit interrupter units 14 and 15 include vacuum type circuit interrupter components 20 (shown in FIG. 2) which are electrically connected to three-phase terminals 22 and 24 disposed to make electrical contact with primary terminals (not shown) in the rear of the metal enclosure 12 when the circuit interrupter units are pushed into the metal enclosure and firmly seated in their normal operating positions in the manner well known in the art.

As shown in FIG. 3, each of the circuit interrupter components 20 consists of a pair of electrically conducting end plates 23, 25 that are fastened to an insulating cylinder 26 to form a vacuum chamber that contains a pair of separable electrical contacts 28, 30. Contact 28 is stationary and supported within the vacuum chamber by a contact stem 29 that extends through the end plate 23 and is connected to the associated three-phase terminal 24 by a suitable conductor assembly 32. Contact 30 is reciprocally movable (as indicated by the arrow) and supported by another contact stem 31 that is reciprocally movable along the axis of the cylinder 26 and secured to the associated end plate 25 by a suitable bellows (not shown) which expands and contracts to permit the contact 30 and its stem 31 to move toward and away from the stationary contact 28 without rupturing the vacuum housing. Contact stem 31 is connected to the other three-phase terminal 22 by another conductor assembly 33 which has an angularly bent medial portion that provides the required flexibility to accommodate the movement of the contact stem 31 and contact 30 during the make-circuit and break-circuit operation of the circuit interrupter unit 15.

The movable contact 30 and its support stem 31 are actuated by the customary trip and spring-powered operating mechanisms (not shown) which are housed in the front compartment 13 of the interrupter unit 15 and rotate a main operating shaft 34 that extends laterally along the lower portion of the compartment. Rotation of the operating shaft 34 in a counterclockwise direction (as viewed in FIG. 3) moves a link 35 which is coupled to a lever arm 36 in such a way that the lever arm is reciprocally driven toward the front panel 17 of the interrupter unit 15. This movement is transferred to the movable stem 31 by a second link 37 which is so arranged that the stem 31 and its contact 30 are rapidly pulled downward, thus separating the contacts 28, 30 and interrupting the circuit. The sudden opening of the contacts 28, 30 creates an arc which extinguishes on the next occurring zero due to the insulating dielectric properties of the vacuum in which the contacts are disposed. The operating shaft 34 continues rotating until the contacts 28, 30 are spaced a predetermined distance apart.

The circuit-reclosing cycle is achieved by the reverse movement of the operating mechanism and main shaft 34 which advances the movable contact 30 toward the stationary contact 28 and finally seats it in firm abutting engagement therewith (as indicated by the phantom depiction of the electrodes in FIG. 3). This circuit-reclosing operation simultaneously compresses and cocks the driving spring (not shown) of the operating mechanism which rapidly actuates and accelerates the movable contact 30 during the contact-opening stroke of the tripped breaker when the main operating shaft 34 is rapidly rotated and such movement is transferred to the movable contact 30 through the coupling system previously described.

Various shield arrangements may also be provided within the vacuum chamber of the interrupter component 20 to prevent vaporized metal material from being deposited on the inner walls of the insulating cylinder 26 and the portion of the bellows that extends into the vacuum chamber, as will be apparent to those skilled in the art.

In accordance with the present invention, the kinetic energy generated by the movable contact 30, the main operating shaft 34, and the other components of the breaker operating mechanism that are coupled to the movable contact 30 is rapidly dissipated during the opening stroke of the breaker by a compressible multiple-impact shock-absorbing assembly 40 that is mounted on the back panel 19 of the circuit breaker unit 15 adjacent the operating shaft 34 and extends laterally along the bottom portion of the breaker compartment 13, as illustrated in FIG. 3. The support member 21 that forms the bottom panel of the support chassis extends upwardly along and reinforces the part of the back panel 19 that is secured to and serves as a base for the shock-absorbing assembly 40. As shown, the shock-absorbing assembly 40 comprises a series of discrete bodies of durable dense magnetizable material such as a plurality of steel plates 41 that are held in loosely stacked relationship along a substantially horizontal axis by a pair of elongated pin-like guide members such as a pair of bolts 42 of non-magnetic material, only one of which is shown in FIG. 3. Each of the steel plates 41 is magnetized in such a fashion that adjacent plates repel one another. The magnetized metal plates 41 are thus spaced from one another when the shock-absorbing assembly 40 is in relaxed "dormant" condition. The stack of metal plates 41 is so positioned within the breaker unit 15 that a suitable striker member such as a metal lever 44 rigidly attached to the main operating shaft 34 swings toward the stack along an arcuate path (as indicated by the arrow) during the contact-opening stroke of the breaker and strikes the first plate 41 in the stack.

The angular position of both the main operating shaft 34 and striker lever 44 bear a fixed relation to the position of the movable breaker contact 30 so that at a predetermined time during the contact-opening stroke, the head 45 of the lever 44 hits the first plate 41 in the stack which comprises the shock-absorbing assembly 40 and initiates the shock-absorbing action.

As shown in FIG. 4, the plates 41 are rectangular in shape and the guide bolts 42 of non-magnetic metal which hold the plates 41 in loosely-stacked array are spaced apart a distance sufficient to permit the head 45 of the striker lever 44 to pass between the bolts 42 and hit the stack of plates 41 when the breaker unit 15 is tripped and the main operating shaft 34 is rotated. The bolts 42 make a loose sliding fit with aligned U-shaped slots 43 provided at opposite side edges of each of the plates 41. The heads of the bolts 42 are provided with washers to prevent the plates 41 from slipping off the bolts 42 and the bolts are lubricated to minimize friction as the plates 41 slide along the bolts 42. While the plates 41 as illustrated are of rectangular shape and the same size and thickness, these features are not critical and may be altered as long as the plates 41 fit within the available space in the breaker unit 15 and are freely slidable toward and away from each other along the guide bolts 42 or other suitable non-magnetic holder means.

Figure 5:
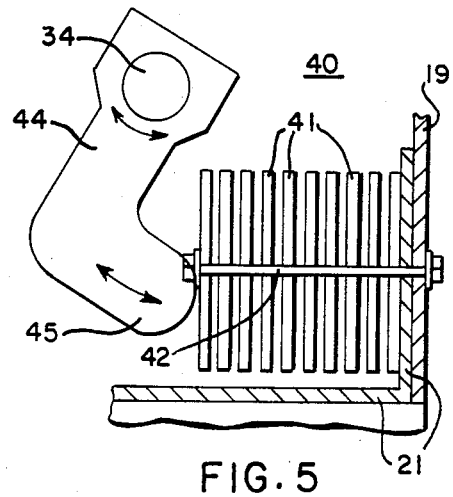
FIG. 5 is an enlarged side elevational view of the striker lever and the shock-absorbing assembly in relaxed condition with the magnetized plates separated from one another (contact-closed position)

As shown in FIG. 5, when the breaker contacts 28, 30 are closed and the striker lever 44 is in its retracted position, the shock-absorbing assembly 40 is in dormant "expanded" condition with the individual metal plates 41 magnetically repulsed from each other and spaced uniform distances apart.

However, after the circuit breaker unit 15 has been tripped and is in contact-open condition, the operating mechanism and main drive shaft 34 of the breaker have swung the striker lever 44 through an arc such that the head 45 of the lever is in contact with the exposed plate 41 at the end of the multiple-impact shock-absorber assembly 40 and the stack of plates 41 is collapsed with adjacent plates in intimate contact with each other. When the breaker unit 15 is reclosed and the striker lever 44 has been retracted, the magnetized steel plates 41 again repel each other and such repulsion automatically resets the plates 41 in their original spaced-apart relationship and returns the shock-absorbing assembly to its relaxed "expanded" condition.

OPERATION OF SHOCK-ABSORBING ASSEMBLY

When the lever 44 strikes the end plate 41 of the horizontally-disposed shock-absorbing assembly 40 at a predetermined time during the contact-opening stroke of the circuit breaker unit 15, this first impact of the metal lever 44 causes some of the kinetic energy to be transferred to the end plate 41 and results in a small total energy loss due to the imperfect restitution properties of the plate and lever materials. The net result is that the first impact of the striker lever 44 with the stacked plates 41 reduces the velocity of the lever and, due to the small mass of the plate, propels the end plate 41 away from the lever 44 at a speed greater than that of the lever. As a result of this momentum exchange, the end plate 41 overcomes the magnetic repulsive force separating it from the adjacent plate and thus collides with the next plate in the stack.

Since the plates 41 are of the same shape and size, they each have the same weight or mass. The collision of the first two plates 41 thus brings the end plate to a standstill and the second plate in the stack is propelled toward the third plate at about the same speed or velocity at which the end plate was traveling before it impacted the second plate. The second plate, in turn, is stopped and brought to rest after it overcomes the magnetic repulsive force and collides with the third plate in the stack. These sequential plate collisions proceed at rapid speed through the stack until the last plate in the stack is impacted. Since this plate is fixed in place and stationary, the adjacent plate rebounds after hitting it and thus moves in the reverse direction back toward the next plate in the stack.

As the succession of impacts rapidly proceeds back and forth through the stack of plates 41, the striker lever 44 attached to the main operating shaft 34 continues to move laterally at a reduced speed due to its first impact with the end plate 41 and then again strikes the end plate 41 which has been brought to rest and is stationary as a result of its previous impact with the second plate in the stack. As a result of this second impact of the striker lever 44 with the end plate 41, additional kinetic energy is transferred from the lever 44 to the end plate 41 and the series of impacts and momentum-exchanges between each pair of successive plates proceeds in the same manner as described previously, until the next to the last plate in the stack is reached. This plate may, at this time, be moving slowly away from the last plate or it may be almost in contact with the last plate.

While these sequentially-occurring plate collisions and momentum-exchanges are taking place, the lever 44 strikes the end plate 41 for a third time which produces another succession of impacts between the other plates 41 in the stack. After the fourth, fifth, sixth or possibly seventh collision and momentum exchange between the striker lever 44 and the end plate 41, the speed of the lever 44 will have been progressively decreased until the lever and the coupled operating shaft 34 and movable contact 30 are brought to rest within a predetermined period of time and travel distance. The deceleration is achieved in such a manner that the contact override and the rebound effect are well within the tolerance limits set for the interrupter unit 15.

The sole function of the magnetic repulsive force is to keep the metal plates 41 spaced a small distance apart rather than to absorb any significant amount of kinetic energy when the shock-absorbing assembly 40 is struck and compressed. The energy-dissipating effect of this magnetic force has accordingly not been mentioned in the aforesaid description of the series of multiple collisions and momentum-exchange impacts between the stacked plates 41 and striker lever 44. The conversion of some of the kinetic energy into heat and noise during each plate-to-plate collision as a result of the imperfect restitution properties of the materials has also been omitted from the description of the sequential lever-plate interactions in the interest of brevity.

It will accordingly be apparent to those skilled in the art that the multiple-impact shock-absorbing assembly 40 of the present invention achieves the desired rapid and smooth deceleration of the striker lever 44 (and hence the movable contact 30 and associated coupled operating parts of the interrupter unit 15) by decreasing the velocity of the contact 30 and lever 44 through a series of impacts and momentum exchanges between the total equivalent mass of the interrupter components and the much smaller mass of the end plate 41 in the stack—and the resultant concomitant removal and dissipation of the kinetic energy by the mutliple collisions and momentum exchanges which sequentially occur between adjacent pairs of the plates 41 within the stack as a result of each of the subsequent impacts between the advancing striker lever 44 and end plate 41.

The invention is not limited to a compressible multiple-impact shock-absorbing assembly 40 of the type illustrated in FIGS. 3-6 wherein a stack of ten steel plates 41 are employed. The number of plates will vary depending upon the total amount of kinetic energy to be dissipated which, in turn, is determined by the size of the circuit interrupter apparatus and the total equivalent mass of the movable contact and associated moving parts of the operating mechanism of the interrupter which must be brought to rest. While the mass of the steel plates is not especially critical, for satisfactory results the mass of each plate should be equal to but no smaller than about 1/100 of the total equivalent mass of the movable contact and other moving parts of the interrupter.

SPECIFIC EXAMPLE

Tests have shown that the compressible multiple-impact shock-absorbing assembly of the present invention is especially adapted for use in vacuum type circuit breakers in the medium voltage range (that is from about 5 to 35 kilovolts). For a 15 KV circuit interrupter having a driving spring and operating mechanism that generated a energy of approximately 50 to 150 foot pounds which opened the contacts (when the interrupter was tripped) and swung the striking lever of the operating mechanism a distance of approximately 25 millimeters, a stack containing from seven to ten plates was required to provide the proper shock-absorbing characteristics and bring the movable contact and operating mechanism to a smooth stop in approximately 10 milliseconds and within the contact override and rebound limits of the design specifications. Each of the plates 41 in this specific embodiment were manufactured from steel and were approximately 10 centimeters square, 7 millimeters thick and had a mass of approximately 600 grams. The plates were permanently magnetized prior to being stacked to form the assembly and the magnetic field was sufficient to maintain a spacing of approximately 4 millimeters between adjacent plates. Magnetic fields as low as 50 to 500 Gauss produced by each magnetized plate will be sufficient to maintain proper separation of the plates when stacked horizontally on well lubricated non-magnetic guides.

While the plates 41 in accordance with this specific embodiment were fabricated from steel and were rectangular in shape, any magnetic material of sufficient hardness and strength to withstand the repeated impacts and collisions can be employed and the plates can be of any suitable configuration. Alloys marketed under the trademark "ALNICO" would be more expensive but very suitable as plate material since such alloys have excellent permanent-magnetic properties and are hard and durable. Such alloys contain iron, nickel, aluminum and minor amounts of cobalt, copper an/or titanium. "ALNICO 5" has a typical composition of 51% iron, 24% cobalt, 14% nickel, 8% aluminum and 3% copper and is the preferred alloy of this type. Since alloys in this general class are somewhat brittle, they may not be suitable as components for shock-absorbing assemblies that are subjected to physical impacts of great magnitude since they could crack or fracture under such mechanical loads. Carbon steel, tungsten steel, chromium steel, cobalt steel, iron-silicon alloys and nickel-iron alloys are stronger in this respect and are also good permânent-magnet materials.

The guide bolts 42 are fabricated from brass, aluminum, an aluminum alloy or other suitable non-magnetic material strong enough to hold the stack of plates 41 in place.

MAGNETIZED PLATE EMBODIMENTS (FIGS. 7-8)

Figure 7:
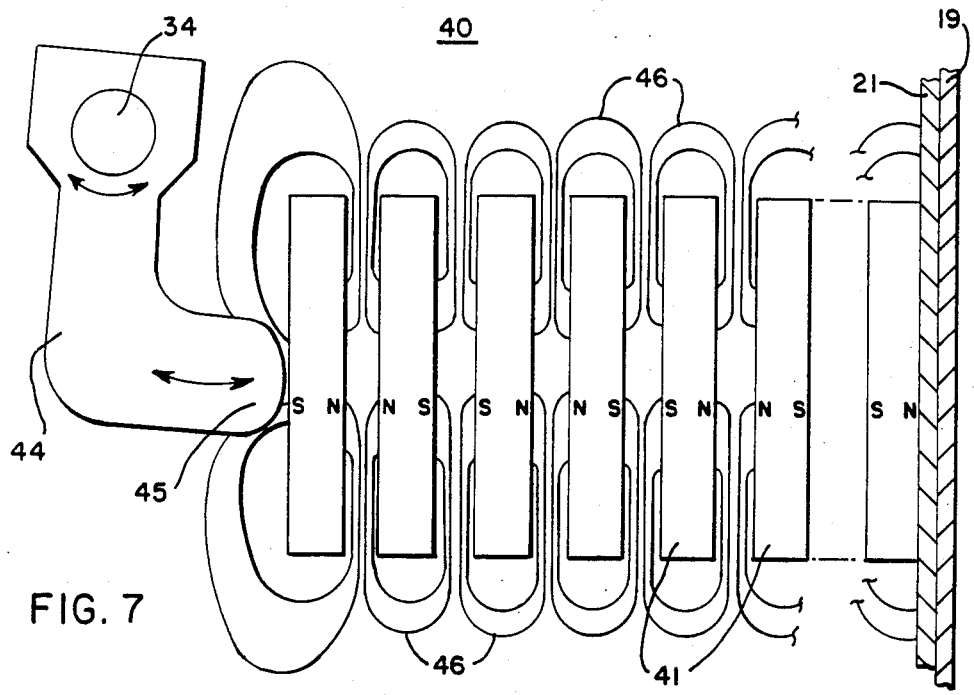
FIGS. 7 and 8 are enlarged diagrammatic views of the shock-absorber assembly illustrating two different modes of plate magnetization and the resulting magnetic flux patterns, the plate-holding means being omitted for illustrative purposes.
Figure 8:
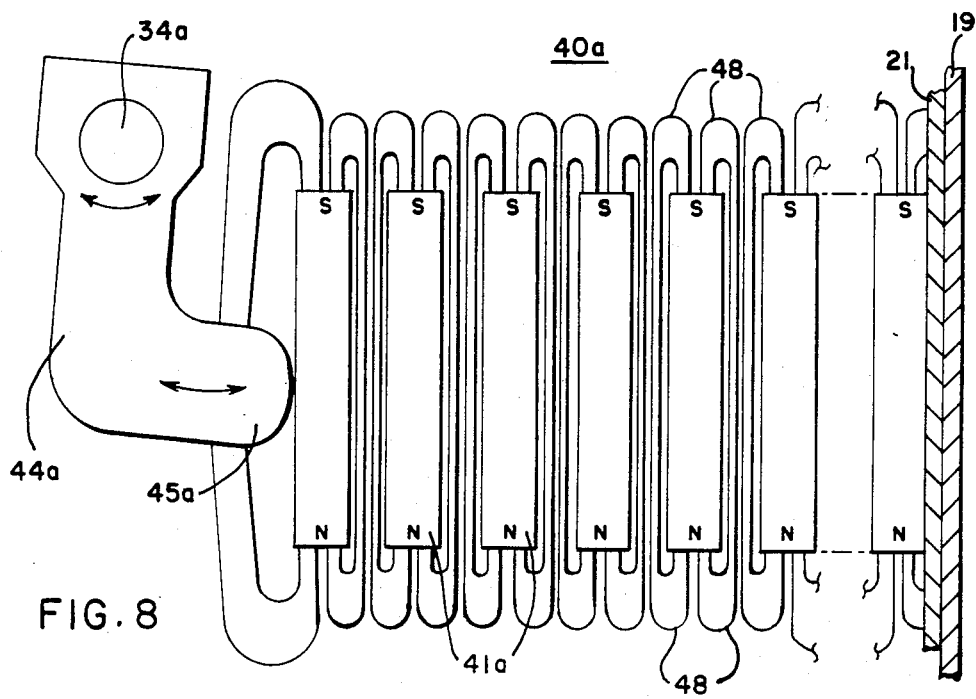

Two embodiments of the manner in which the steel plates are to be permanently magnetized to proivde the magnetic repulsive force required to maintain a spacing between adjacent plates are shown diagrammatically in FIGS. 7 and 8.

As illustrated in FIG. 7, if the steel plates 41 are magnetized in a direction to create north (N) and south (S) poles on the opposing faces of each plate and the plates are stacked so that like poles of adjacent plates face one another, the magnetic flux 46 will extend around the end portions of each plate 41 from the north pole (N) to the south pole (S) in such a pattern that the horizontally-stacked plates will repel one another. The guide bolts used to mount the horizontally-stacked plates on the stationary breaker panels 19, 21 in line with the head 45 of the striker lever 44 are omitted to provide a clear illustration of the magnetic field pattern.

In the FIG. 8 embodiment, the shock-absorbing assembly 40a has horizontally-stacked metal plates 41a that are permanently magnetized in a manner such that the north (N) and south (S) poles within each plate 41a are located at opposite end portions of the plates. Stacking the plates 41a with like poles adjacent one another produces a flux pattern 48 which extends from one end of each plate 41a and along each of its faces to the opposite end—thus concentrating the flux in the air gap between adjacent plates 41a and producing the desired magnetic repulsion of such plates. The guide bolts are again omitted for clarity of illustration.

While the repetitive mechanical impacts and collisions of the steel plates 41, 41a during the shock-absorbing operations will tend to gradually demagnetize the plates and reduce the air gaps separating them, this will not render the shock-absorbing assembly ineffective since the ability of the plates to dissipate kinetic energy and decelerate the equivalent mass of the striker lever and coupled movable parts of the circuit breaker is not significantly diminished by small variations in the plate spacing. Even very small interplate spacings permit the momentum exchanges to occur and dissipate the kinetic energy in rapid sequential fashion.

Figure 9:
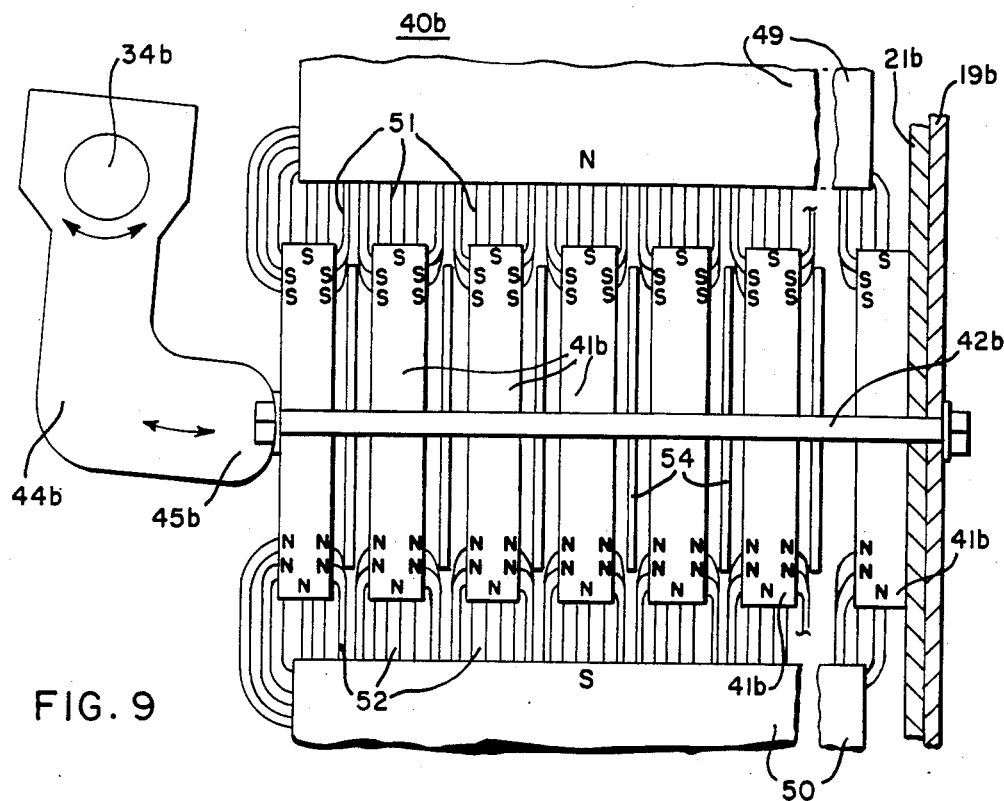
FIG. 9 is an elevational diagrammatic view of another embodiment of the shock-absorbing assembly in which magnetization of the metal plates is achieved by magnets that are external to the plate stack, the magnetic flux patterns again being shown for purposes of illustration.
Figure 6:
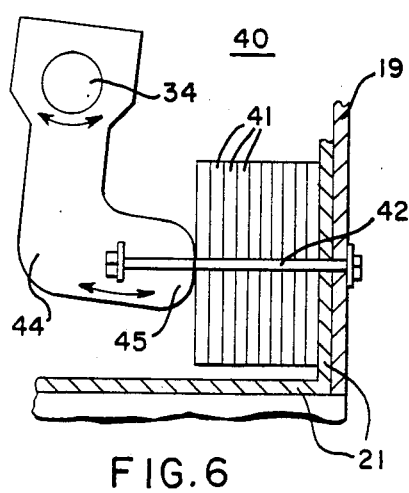
FIG. 6 is a similar view of the shock-absorbing assembly with the magnetized plates compressed by the striker lever at the end of the opening stroke of the circuit breaker (contact-open condition)

In FIG. 9 there is shown an alternative shock-absorbing assembly 40b which avoids potential problems that may be encountered with the previous embodiments in applications which subject the magnetized metal plates to mechanical impacts and vibrations of such magnitude that severe demagnetization of the plates occurs during use.

As illustrated, the metal plates 41b are mounted in horizontal loosely-stacked freely-movable relationship on non-magnetic guide members 42b that are secured to the rear panel 19b and reinforcing panel 21b of the circuit breaker enclosure. The stacked plates 41b are disposed to be impacted by the head 45b of the striker lever 44b when the lever is swung along its arcuate path by the main operating shaft 34b of the circuit breaker operating mechanism.

In contrast to the previous embodiments, the metal plates 41b are not permanently magnetized but are magnetized in situ by a magnetic field produced by a permanent magnet or an electromagnet having end poles 49, 50 that are located on opposite sides of the stack of plates 41b. As shown in FIG. 9, the magnets 49, 50 are so designed and oriented that they generate magnetic flux 51, 52 which induce magnetic poles of the same polarity within adjacent ends of the plates 41b and magnetic poles of the opposite polarity in the other end portions of the plates. The plates 41b are thus magnetically repulsed from one another and separated by air gaps when the shock-absorbing assembly 40b is in dormant "relaxed" condition.

Since the magnets 49, 50 are external to the stack of movable plates 41b, they are not subject to the demagnetizing effects of the mechanical shocks experienced by the plates 41b. To facilitate the in situ magnetization of the plates 41b, the plates can be manufactured from steel or iron alloys that are somewhat "softer" than those employed to make the plates used in the other embodiments. In order to prevent adjacent plates 41b from adhering to one another by residual magnetic forces produced when the stack of plates is tightly compressed during the breaker-trip operation and subsequently returned to its non-compressed "relaxed" condition, thin shims 54 of suitable non-magnetic material (such as brass or aluminum in sheet form) are interposed between the plates 41b.

As will be apparent to those skilled in the art, the external magnets 49, 50 can be permanent magnets of the proper size, shape and strength or electromagnets powered by an electrical supply provided within the circuit breaker.

The present invention significantly reduces the cost of multiple-impact shock-absorbing assemblies since the cost of permanently magnetizing steel plates is only a small fraction of that required to manufacture the thin wafer-like steel springs employed in the shock-absorbing assemblies disclosed and claimed in the aforementioned copending application Ser. No. 640,425, U.S. Pat. No. 4,612,429.

In addition, mathematical analysis of the shock-absorbing characteristics of a stack of spaced movable steel plates has shown that it is the total mass of the stack and not the individual mass of each plate that determines the shock-absorbing effectiveness of the stack. Thus, the plates can be made from sheets of steel or other magnetic metal thinner than that heretofore employed to manufacture such shock-absorbing assemblies.

I claim:

1. In combination with a circuit interrupter having a support structure and a movable contact that is placed in make-circuit and break-circuit relationship with a stationary contact by an operating mechanism having movable parts, means for decelerating and arresting the motion of the movable contact and associated movable parts of the operating mechanism during the contact-opening stroke of the interrupter after the contacts have been separated, said means comprising;

a compressible multiple-impact shock-absorbing assembly that is mounted on a stationary part of the circuit interrupter support structure which is proximate to a movable part of the interrupter operating mechanism and comprises a series of discrete magnetized metal bodies that are disposed in loosely stacked array, said discrete metal bodies being freely movable toward and away from one another and being so magnetized that adjacent bodies magnetically repulse one another and said discrete metal bodies are thereby spaced from each other and separated by air gaps when the shock-absorbing assembly is in relaxed non-compressed condition, means holding said discrete magnetized metal bodies in loosely-stacked freely-movable array, and means for impacting said shock-absorbing assembly comprising a striker that is coupled to said movable part of the interrupter operating mechanism and disposed to advance toward and move away from the compressible shock-absorbing assembly during the contact-opening and contact-closing strokes, respectively, of the circuit interrupter in synchronism with the movement of the movable contact by said operating mechanism, said compressible multiple-impact shock-absorbing assembly being so positioned that, at a predetermined time during the contact-opening stroke of the circuit interrupter, the striker advances toward and hits the shock-absorbing assembly and moves along a path which propels the discrete metal body that is disposed at the end of the assembly which is located adjacent to and is hit by the striker with sufficient velocity to overcome the magnetic force separating the struck discrete metal body from the adjacent discrete metal body and thus initiate a series of sequentially-occurring collisions and momentum exchanges between the respective freely-movable magnetized discrete metal bodies and the advancing striker which rapidly and progressively dissipates the kinetic energy generated by the operating mechanism and moving contact and thus quickly stops the advancing striker and terminates the contact-opening stroke of the circuit interrupter, the operating mechanism of the circuit interrupter including a main operating shaft and the striker being coupled to said main operating shaft, and the main operating shaft being rotatable and the striker comprising a lever which protrudes from the main operating shaft and being so disposed that the angular orientation of said lever has a fixed predetermined relationship to the position of the movable contact.

2. The combination of claim 1 wherein;

said magnetized spaced-apart discrete metal bodies are stacked and freely movable along a predetermined axis, and said lever has a free end portion and is so arranged that said free end portion strikes the compressible shock-absorbing assembly and is movable along a path which extends in substantially the same direction as the axis along which the discrete metal bodies of the shock-absorbing assembly are stacked and freely movable.

3. The combination of claim 1 wherein said discrete magnetized metal bodies are mounted on an upstanding part of the circuit interrupter support structure and are stacked along on axis that extends laterally with respect to the upstanding part of said support structure, said discrete metal bodies comprising a plurality of metal plates that are stacked along an axis that is substantially horizontal when the circuit interrupter is disposed in normal use position, the metal plates being magnetized by a pair of magnets that are disposed on opposite sides of the stacked plates and being so structured and oriented that magnetization of at least the proximate edge portions of the plates is achieved during the contact-opening stroke of the circuit interrupter without interfering with the compression of the shock-absorbing assembly and motion of the striker, and shims of sheet-like non-magnetic material being interposed between adjacent metal plates to prevent magnetic adherence of the plates when the stacked plates are compressed and then relieved from compression.

4. A compressible multiple-impact shock-absorbing assembly adapted for use in a circuit interrupter or other apparatus with movable operating parts that must be brought to rest within a predetermined travel distance and period of time after the interrupter or other apparatus has been tripped or otherwise actuated, said shock-absorbing assembly comprising:

a series of discrete magnetized metal bodies that are disposed in aligned loosely-stacked freely-movable side-by-side relationship with one another along a predetermined axis, said discrete metal bodies being so magnetized that adjacent bodies magnetically repulse one another and said discrete metal bodies are thereby separated by air gaps, and means retaining the discrete magnetized spaced-apart metal bodies in said loosely-stacked relationship without interfering with the free movement thereof in a direction along said axis so that the resulting assembly can be mounted within the circuit interrupter or other apparatus in impacting relationship with one of the movable operating parts thereof and, when thus impacted, initiate a series of sequentially-occurring collisions and momentum exchanges between the adjacent discrete metal bodies and said impacting movable part that rapidly and progressively dissipates the kinetic energy generated by the movable operating parts of the interrupter or other apparatus and quickly stops the motion of said parts, said discrete magnetized metal bodies comprise plates of substantially the same size and configuration, said retaining means comprising a pair of pin-like members that are secured to an upstanding support and extend along opposite sides of the stacked metal plates within aligned loose-fitting openings in the associated side portions of said metal plates, the metal plates being magnetized by a pair of magnets disposed on opposite sides of stacked plates, and shims of non-magnetic material being interposed between adjacent metal to prevent magnetic adherence of the plates when the shock-absorbing assembly is compressed and then automatically returned to non-compressed condition by the magnetic repulsion of said adjacent metal plates.

* * * * *